United States Patent

[11] 3,622,882

[72] Inventor Miles D. Gardner
 Toronto, Ontario, Canada
[21] Appl. No. 832,133
[22] Filed June 11, 1969
[45] Patented Nov. 23, 1971
[73] Assignee General Electric Company

[54] REACTANCE CIRCUIT TESTER
 2 Claims, 4 Drawing Figs.
[52] U.S. Cl. .............................................. 324/158 MG,
 324/55
[51] Int. Cl. ..............................................G01r 27/00,
 G01r 31/06
[50] Field of Search............................................ 324/158,
 158 MG, 55, 51

[56] References Cited
 UNITED STATES PATENTS
 3,267,371 8/1966 Greve ........................ 324/55
 3,328,683 6/1967 Davenport et al. ......... 324/55 X
 2,890,407 1959 Huehn et al. ............... 324/158 X
 2,890,410 1959 Holcomb ..................... 324/55 X
 2,990,514 1961 Johnson ...................... 324/55

OTHER REFERENCES

Winklepleck, R. L.; " Check Inductors with a Test Probe";
Electronics World; June 1959; pages 33, 117, 118; copy in
324– 51

Primary Examiner—Michael J. Lynch
Assistant Examiner—Ernest F. Karlsen
Attorneys—James C. Davis, Jr, Edward W. Goebel, Jr, Frank
 I. Neuhauser, Joseph B. Forman and Oscar B. Waddell ABSTRACT: Low-impedance circuits such as the armature windings of DC motors are tested for faults by equipment which delivers to them electric power surges having wave fronts with a rapid rate of change of voltage and current with respect to time, thereby causing a ringing oscillation to occur within these circuits. This ringing oscillation is inspected and compared with the type of oscillation which should occur in a circuit of this type having no fault to determine whether a fault exists. The equipment has a test probe which is physically separable from the surge generator. A capacitor used to develop the oscillation in the electric circuit being tested is mounted directly on the probe itself and is isolated from the surge generator by means of a fast recovery rectifier circuit. The surge generator may be provided with a capacity to deliver high current pulses through low-impedance coaxial couplers to the probe to burn out contaminants which tend to short out windings of the armatures.

INVENTOR.
MILES D. GARDNER
BY Edward N. Goebel
HIS ATTORNEY

REACTANCE CIRCUIT TESTER

BACKGROUND OF THE INVENTION

This invention relates to testing equipment, and more particularly, to testing equipment for low-impedance electric circuits such as the armature windings of dynamoelectric machines.

Numerous types of testing equipment have been developed to determine whether a fault has occurred in an electric circuit or in an electric component such as an inductor. Where an inductor is being tested, prior art equipment has provided a pulse of electric power to it and a resulting decaying oscillation or ringing in this inductor in combination with a capacitor included in the test equipment has been observed on an oscilloscope. Many prior art test equipments included as much or more inductance in extraneous circuits, subject to the oscillations, as was present in the inductance being tested. A wave shape of the decaying oscillation is compared with the wave shape which should occur if the inductor has no faults to determine the condition of the inductor.

While test equipment of this type has been generally available for some time, this prior art equipment has not been found to be satisfactory for testing circuits and components having very low impedances, such as the armature windings of dynamoelectric machines, including motors rated one hp. and larger or generators rated one kilowatt and larger. The low impedance of the individual armature coils of these machines makes it difficult for prior art test equipment to effectively and quickly locate short circuits in the windings which further decreases the impedance of these coils. Typical resistance values of armature coils which were found difficult to test range in a neighborhood of about 4 ohms for a 1 hp. motor down to about 0.01 ohms for a 100 hp. motor.

SUMMARY OF THE INVENTION

Accordingly, it is an object of this invention to provide test equipment which can rapidly and accurately determine whether a fault exists in a low-impedance inductor.

It is another object of this invention to provide test equipment which rapidly and accurately locates short circuits occuring in low-impedance armature windings of dynamoelectric machines.

It is yet another object of this invention to provide test equipment which aids in correcting short circuits caused by contaminants which become lodged between conductors of armature windings of dynamoelectric machines when the armatures are being wound or repaired.

Briefly stated, and in accordance with one aspect of this invention, equipment for testing an inductive electric component includes means for generating a surge of electric energy and surge delivery means physically separable from the means for generating the surge and adapted to couple the surge to the component. The surge delivery means has a capacitor connected across a pair of contacts which are connectable to the electric component being tested. A highly satisfactory damped oscillation occurs with this arrangement each time a surge is transmitted through low-impedance coupling means to the surge delivery means because of the proximity of the capacitor to the component. Where the quality of a very low-impedance electric component is being tested, the oscillation is further improved by mounting a fast recovery rectifier circuit on the surge delivery means between one path of the low-impedance coupling means and one of the contacts. In this manner the damped oscillation which is generated in the capacitor and the electric component is effectively isolated from the means for generating the surge, and reverse current in the surge generation means is prevented.

In accordance with still a further aspect of this invention, it has been found that some of the faults which cause short circuits in electrical inductors such as the windings of dynamoelectric machines can be corrected through the use of the testing equipment itself. The means for generating the surges of electric power is provided with a capacity for delivering high-current power surges of a magnitude which is calculated to burn out contaminants that have caused the short circuits to occur.

In yet another aspect of this invention, especially applicable to its use in correcting short circuits in the testing of assembled dynamoelectric machine armatures, adjustability of the contacts in the surge delivery means is provided. This enables the coupling of the surges to components of various sizes and circuit configurations. Since inductive coupling of the particular circuit being tested to others in such a structure results in the generation of extraneous voltages, a shunting member is incorporated in the surge delivery means. The shunting member forms an intentional short circuit of inductively coupled circuits not being deliberately surged at this particular point in time and prevents any significant voltage buildup therein.

The novel features of this invention are set forth with particularity in the appended claims. The following description should be referred to together with the accompanying drawings for a better understanding of the principles and applications of this invention.

Numerals employed to identify a portion or part of the repetitive power surge testing equipment in any figure identify that portion or part in whatever figure it appears.

Figure 1:
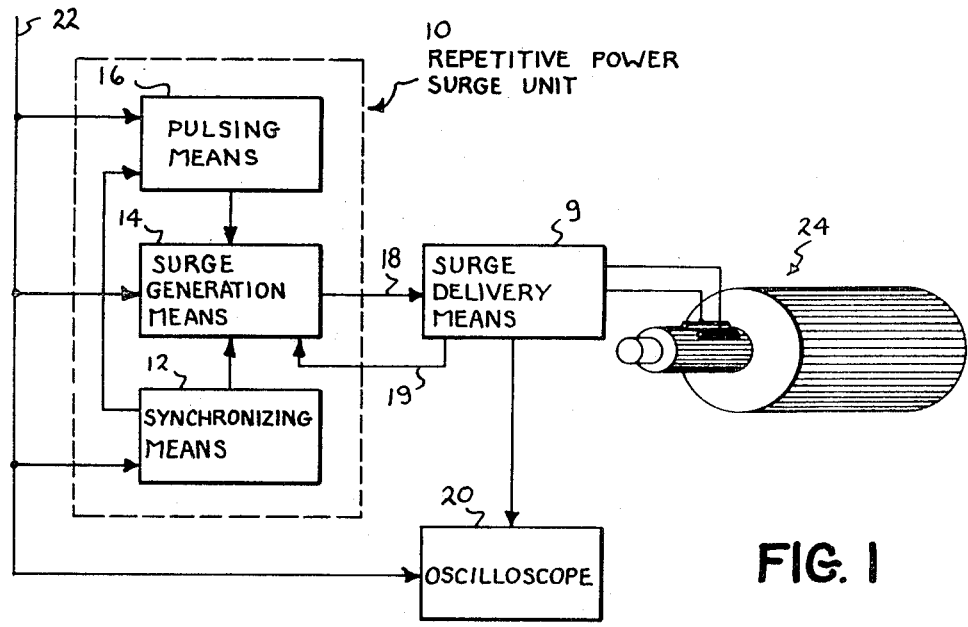
FIG. 1 is a block diagram of a first embodiment of a repetitive power surge testing equipment of this invention.

Referring now in more detail to the drawings, FIG. 1 is a block diagram showing the physical relationship between a surge delivery means 9 and a repetitive surge unit 10. The surge delivery means 9 receives power surges from the repetitive surge unit 10, both of which make up the basic components of the test equipment of this invention.

The power unit 10 includes repetitive surge generation means 14 which develops the surges of electric power having a wave front with a rapid rate of change of voltage and current with respect to time. The surge generation means is capable of being triggered by pulsing means 16 in response to a signal received from synchronizing means 12. The test equipment is energized by AC power coupled from an input power connection 22. The synchronizing means 12 is adapted to cause surges of electric power to be developed in the surge generation means 14 at a preselected portion of an AC input voltage cycle so as to insure that approximately a preselected amount of power is coupled through surge coupling means 18 and 19 to the surge delivery means 9.

The surge coupling means 18 and 19 provide low-impedance electric paths between the power unit 10 and the surge delivery means 9. While for many applications of this invention it is possible to use normal electric conductors which are designed to carry the level of power to be transferred to the surge delivery means 9, the operation of the test equipment of this invention is optimized where the paths comprise a plurality of length of low-impedance coaxial cable. The length of the paths 18 and 19 should be kept at a minimum to avoid power losses and improve the quality of the tests being performed.

The surge delivery means 9 includes a pair of contact 26 and 28 which complete a circuit between the surge delivery means 9 and a circuit or component 24 which is being tested. The component 24 which is being tested in FIG. 1 is an armature of a dynamoelectric machine. The illustrated armature comprises armature winding 25 having a number of coils, each of which terminates at both ends at separate bars of a commutator 27. The type of armature shown comprises a plurality of bars of conductive material which are insulated from each other and are mounted on a supporting structure in an axial direction with respect to the armature itself. In the process of manufacturing and mounting these armatures, chips and burrs of conducting material may be produced and are sometimes lodged between conductors. These chips and burrs can produce short circuits between conductors and thereby adversely affect the operation of a finished armature to the point where the armature may have to be reworked if the contaminant which is causing the defect cannot be spotted visually or located by test equipment. As stated above, the low impedance of the armature windings has heretofore made it extremely difficult to detect the fact that an armature is defective prior to mounting the armature within the frame of a dynamoelectric machine and testing the operation of the machine. After it has been found that the machine does not perform in accordance with its design specification, it has been difficult to determine the location of a fault in the armature winding and to correct the fault without disassembling the armature.

The contacts 26 and 28 of the surge delivery means 9 are retained therein in an adjustably fixed relationship. This facilitates ready adaptation of the equipment to a variety of dynamoelectric machine armatures. A shunting member 29 (FIG. 3) establishes a short circuit between commutator bars beyond the spread of the contacts 26 and 28. This provision inhibits the development of induced voltages in armature circuits other than the one undergoing test, thereby increasing safety in the immediate area.

In accordance with one aspect of this invention, it has been found that this test equipment can eliminate the difficulty of locating and thereafter correcting short circuits in armature windings caused by contaminants by providing the surge generation means 14 with the capacity for generating surges of electric power having a power level which is calculated to burn out the type of contaminants which normally cause short circuits to occur in the windings. The peak current level of a pulse of this type and the amount of power which is delivered through the surge delivery means 9 to the component being tested 24 will differ depending upon the nature of the component being tested and the type of contaminants which have been found to cause defects in these components.

In one application of this invention, a current pulse having a 900 ampere peak and lasting for about 5 microseconds was used to burn out contaminants in the armature of a dynamoelectric machine. This contaminant burn out by the current pulse at times involves fusion and vaporization of the offending, fault-creating material, or may take the form of material blow out. In the latter instance, the motion imparted to the offending material results from the combination of the rate of increase of the current flow and the magnitude of that current. These parameters create an intense magnetic field which reacts with the supporting structure to produce motion of a conductive contaminant.

Figure 2:
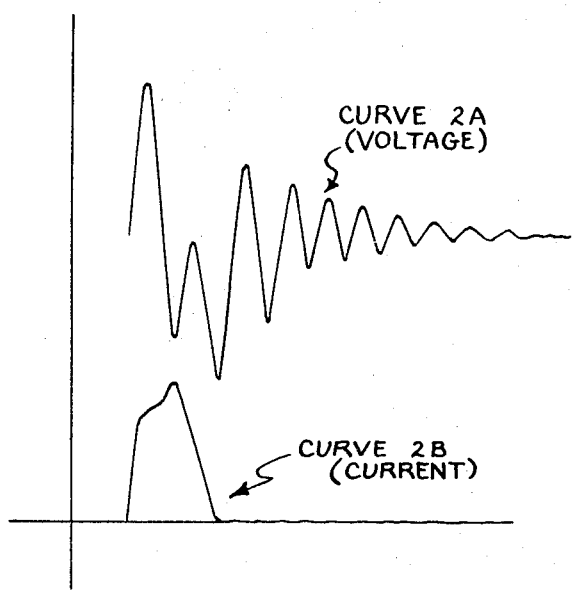
FIG. 2 portrays typical voltage and current traces yielded by a single surge of the repetitive power surge testing equipment of this invention.

FIG. 2 shows a simultaneous plot of both the voltage and current which is delivered from the surge generation means 14 and the surge delivery means 9 to the armature which was tested by the test equipment of this invention. The curve 2A shows the voltage pulse plotted with respect to time as it was delivered to the armature, while curve 2B shows a plot of the current with respect to time.

As mentioned above, the current pulse shown on curve 2B rises to a peak level of 900 amperes and the total lapsed time of the pulse is about 5 microseconds, with the peak occurring about 2½ microseconds after the start of the current pulse. The first spike of the voltage pulse of curve 2A rises to a peak of about 400 volts in about 1½ microseconds. The curve 2A shows the decayed voltage oscillation or ringing which occurs when the power surge is delivered to the component being tested. In accordance with another aspect of this invention explained more fully with respect to FIG. 3, the surge delivery means 9 is physically remote from the repetitive power surge unit 10 and contains a capacitor which is connected directly to the contacts 26 and 28 so that a winding of the armature being tested can resonate more effectively with this capacitor at the resonant frequency of their combination. This ringing is observed on an oscilloscope 20 which is connected by the surge delivery means 9 to the resonating circuit. By mounting the capacitor as close as possible to the contacts 26 and 28, instead of mounting the capacitor within the power unit 10 itself, the power surge delivered to the component being tested provides a decaying oscillation having more distinct undulations to the point where the seventh or eighth undulation can be observed on an oscilloscope to determine whether a fault actually exists in a low-impedance component.

The operation of FIG. 1 can be summarized briefly as follows: Upon an indication that a surge of electric power should be applied to a component being tested, power is accumulated within the surge generation means 14. At a preselected point in a voltage wave of the AC power source the synchronizing means 12 triggers the pulsing means 16 to cause it to turn on the surge generation means 14. The surge of electric power having a rapid rate of change of voltage and current with respect to time is transmitted through the electric paths 18 and 19 to the surge delivery means 9 and from there through the contacts 26 and 28 to the armature being tested. The decaying oscillation produced in the combination of the armature windings 25 and the capacitor connected to the contacts 26 and 28 is observed on the oscilloscope 20 and is compared with the oscillation which should occur if the armature windings have no faults. A difference between the actual and the desired wave form indicates the occurrence of a fault in the armature windings.

Where it is desired to use the test equipment to correct for some of the more common faults caused by contaminants which build up while the armature is being manufactured, the surge generation means 14 is provided with the capacity for supplying an amount of current sufficient for burning out these contaminants. Thus where chips and burrs and filings short out one or more conductors of armature windings, these contaminants are burned out when the conductor is energized.

Figure 3:
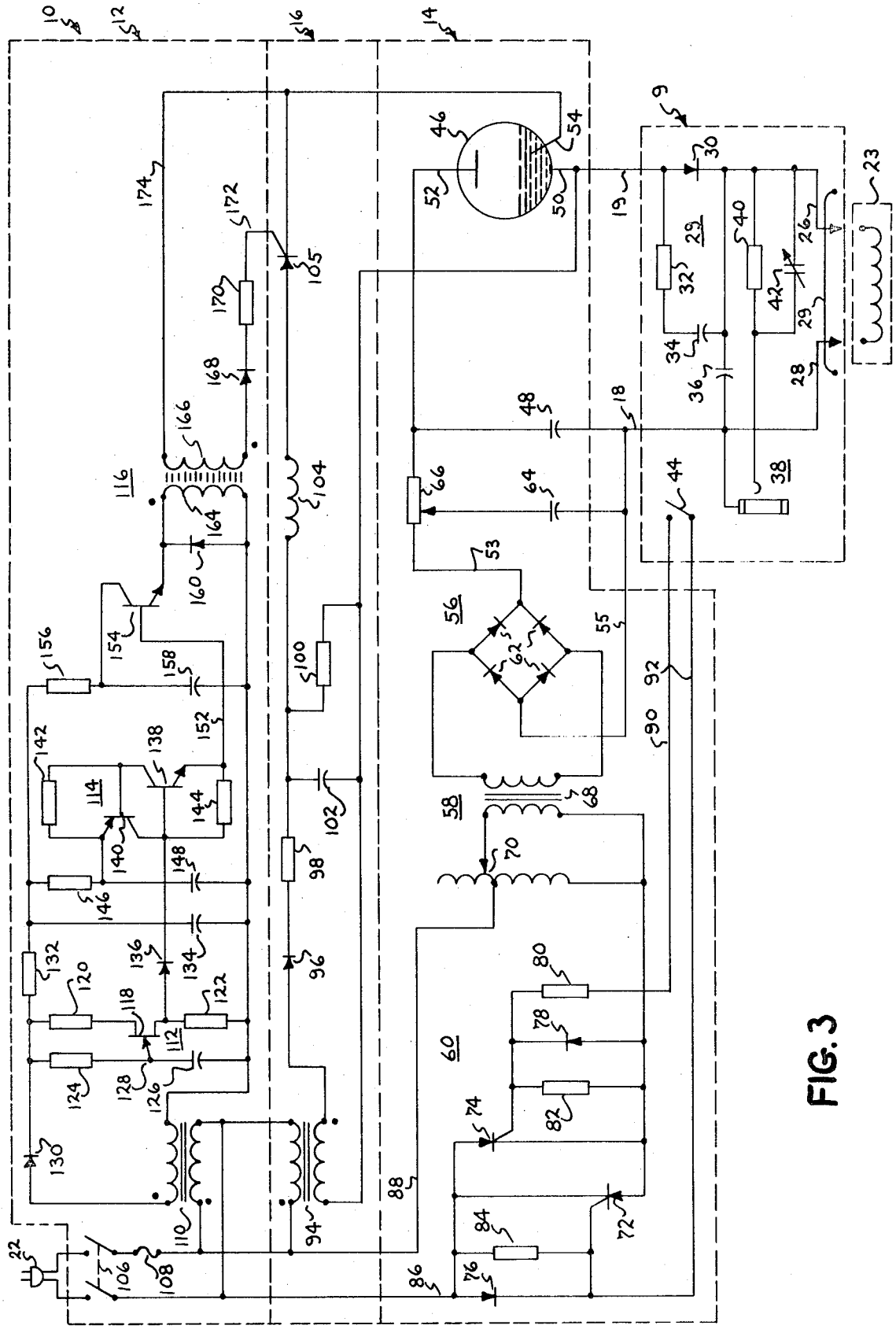
FIG. 3 is a detailed schematic diagram of the first embodiment of this invention.

FIG. 3 is a schematic diagram of the preferred embodiment of the test equipment of this invention shown in FIG. 1. In accordance with this invention, the surge delivery means 9 is shown to contain a capacitor 36 which is connected across the contacts 26 and 28. The component to be tested 23 is shown schematically as an inductor. In further accordance with this invention, the decaying oscillation which occurs in the capacitor 36 and the component 23 when they receive a surge of power from the surge generation means 14 is isolated from this surge generation means 14 by means of a fast recovery rectifier circuit 29. In this circuit, a fast recovery rectifier 30 which is capable of very rapidly going to a nonconductive state when it becomes reversed biased has a suppression circuit including a series connected resistor 32 and capacitor 34 connected thereacross. The suppression circuit protects the rectifier 30 from failure by attenuating high-voltage transients which might otherwise develop across the rectifier 30 itself.

Figure 4:
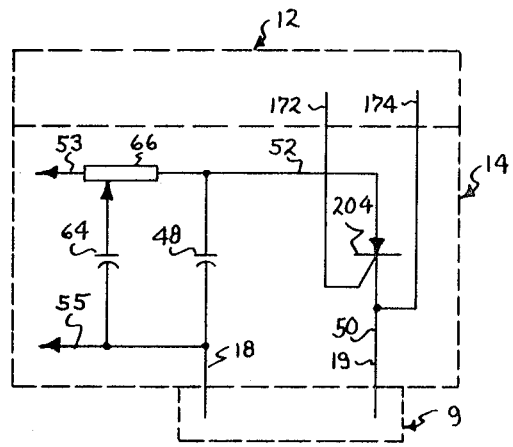
FIG. 4 details schematically that portion of a second embodiment wherein the surge generation means differs from that in the first embodiment and permits omission of a pulsing means between its synchronizing means and surge generation means.

The rectifier 30 serves the combined purposes of excluding dissociated circuitry from the oscillations established between the capacitor 36 and the component to be tested 23, and of preventing the application of reverse potential to the controllable switch means 46, FIG. 3 or 204 of FIG. 4. The former of these accomplishments aids in insuring that variables external to the component to be tested 23 do not influence or distort the results observable on the oscilloscope 20, while the latter protects the surge generation means 14 against possibly damaging inverse voltage spikes which, in the first embodiment, FIG. 3, may cause misfiring of the ignitron 46.

The coupling path 18 is connected from the surge generation means 14 directly to the contact 28, while the coupling path 19 is connected through the fast recovery rectifier circuit 29 to the contact 26. For he most advantageous operation of the test equipment of this invention, the couplings 18 and 19 should be kept as short as possible and the wiring between the various components of the surge delivery means 9 should be of a minimum length and arranged to yield a minimum amount of cross coupling between the components.

The surge delivery means 9 further includes contacts 38 adapted to be connected to the input of the oscilloscope shown in FIG. 1 and a surge initiating switch 44 which is to be closed whenever an operator of the test equipment of this invention desires to have a pulse delivered to the component being tested 23. One side of the contacts 38 is connected to the contact 28, while the other side is coupled through a parallel-connected attenuating resistor 40 and capacitor 42 to the contact 26. The switch 44 is connected to a circuit within the surge generation means 14 as will be explained below.

The surge generation means 14 comprises a high voltage, high current, controllable switch means 46, shown as an ignitron tube by way of example. A first output connection 50 at the cathode of the tube 46 is connected in series circuit relationship with the first surge coupling means 19. This first output connection 50 is also connected to the pulsing means 16 to form a return path for the firing pulses delivered to a trigger input 54 of the ignitron tube 46. A second output connection 52 at the anode of the ignitron tube 46 is connected to one side of a high-speed discharge capacitor 48, the other side of which is connected to the second surge coupling means 18 and to a first power supply 56. Connections made between the first output connection 50 of the tube 46 and the first surge coupling means 19, and the connections from the ignitron tube 46 to the high-speed discharge capacitor 48 and thence to the second surge coupling means 18, should be of minimum possible length and physically arranged to minimize coupling therebetween.

The power supply 56 comprises a single phase, full wave rectifier bridge made up of four diode rectifiers 62 and also includes a first filter capacitance 64 and a voltage divider 66. This first power supply 56 furnishes voltage and current of appropriate magnitude for operation of the controllable ignitron tube 46 and the discharge capacitor 48.

In addition to the ignitron tube 46, the high-speed discharge capacitor 48, and the power supply 56, the surge generation means 14 also includes a power transformer 58 and a static switch 60.

The power transformer 58 comprises an isolation transformer 68, in which the circuit voltage is raised approximately to a required level, and an adjustable transformer 70 for setting the circuit voltage at the desired level. Adjustable transformer 70 has an output range of from substantially zero to approximately 135 percent of an input voltage.

In the static switch 60, controlled rectifiers 72 and 74 are connected to an inverse parallel configuration with diode rectifiers 76 and 78, respectively, connected across the gates and cathodes of these controlled rectifiers to short out the gate circuits while the controlled rectifiers are reverse biased. Resistors 80, 82, and 84 limit the current flow within the static switch 60. Electrical connections 86 and 88 couple the static switch 60 to the input power connection 22. Electrical connections 90 and 92 interconnect the static switch 60 with the surge-initiating switch 44 in the surge delivery means 9. When the switch 44 is closed, the static switch 60 is able to couple power to the transformer 58.

The pulsing means 16 includes a step-up transformer 94, having its secondary winding connected through a diode rectifier 96 to a filter and suppression network which includes a series resistor 96, a parallel connected resistor 100 and filter capacitor 102 and a choke 104. The output of the choke 104 is coupled through the anode of a controlled rectifier 105 which has its cathode connected to the trigger input 50 of controllable ignitron tube 46 in the surge generation means 14. The controlled rectifier 105 controls the firing of the switch means 46.

The synchronizing means 12, like the pulsing means 16 and the surge generation means 14, derives its power from the input power connection 22 through a disconnect switch 106 and a fuse 108. A stepdown transformer 110 in the synchronizing means 12 reduces the voltage level therein to a value compatible with its other components. The synchronizing means 12 also comprises a relaxation oscillator 112, a trigger 114 and a pulse former 116.

The relaxation oscillator 112 includes a unijunction transistor 118 having bias resistors 120 and 122 connected to its base electrodes and a resistor 124 and a capacitor 126 selected to yield suitable oscillation frequency. The emitter of the unijunction transistor 118 is connected to a point 128 between the resistor 124 and the capacitor 126. A diode rectifier 130 supplies a half-wave rectified DC voltage to the synchronizing means 12.

A resistor 132 and a capacitor 134 filter the output from diode 130 for application to the trigger 114 and the pulse former 116. A diode rectifier 136 connects the output of relaxation oscillator 112 to the trigger 114.

The trigger 114 is a mixed transistor, cross coupled, bistable trigger including an NPN-type transistor 138 and a PNP-type transistor 140. Limiting resistors 142 and 144 are connected in the emitter circuits of these transistors, while the emitter of the transistor 140 is biased by the voltage developed through resistor 146 and across a capacitor 148.

A signal coupled from the relaxation oscillator 112 and through the diode rectifier 136 and an electrical connection 150 causes the trigger 114 to fire, whereby it delivers its output through an electrical coupling 152 to the pulse former 116.

The pulse former 116 comprises a transistor 154 which is biased by a resistor 156 and an energy storage capacitor 158. A commutating diode rectifier 160 is connected across a primary winding 164 of an isolating pulse transformer 162. A secondary winding 166 of the pulse transformer 162 is connected through a diode rectifier 168, resistor 170 and output connections 172 and 174 to the gate circuit of the controlled rectifier 105. The repetitive pulses produced at the output connections 172 and 174 by the synchronizing means 12 turn on the controlled rectifier 105 in the pulsing means 16 which, in turn, initiates repetitive firing of the controllable ignitron tube 46 in the surge generation means 14.

OPERATION OF FIG. 3

Having established the input power connection 22 and closed the disconnect switch 106, line power is available at the synchronizing means 12, the pulsing means 16, and the surge generation means 14 of the pulse unit 10. The line power modified by the stepdown transformer 110 of synchronizing means 12 is half-wave rectifier by the diode rectifier 130. The charging rate of the capacitor 126 determines the frequency at which the unijunction transistor 118 causes the synchronizing means 112 to provide firing signals for the control rectifier 105 and thus causes the ignitron tube 46 to be fired. The regenerative transistor trigger 114 increases the slope of the voltage and current wave front of the pulse which is delivered to it from the relaxation oscillator 112. The resulting pulse is further amplified by the transistor 154 and is coupled through the transformer 162 of the pulse former 116 to turn on the controlled rectifier 105. The controlled rectifier 105 of the pulsing means 116 is forward biased by the half-wave rectifier and filtered power which is received from the transformer 94.

Upon the firing of this controlled rectifier 105, a firing pulse is supplied to the control electrode of the ignitron 46 to turn it on. Since the controlled rectifier 105 must be fired at a time when it is forward biased by the half-wave rectifier voltage supplied to it, the polarization of the transformers 94 and 110 must be closely observed to be sure that the synchronizing means 112 supplies firing pulses to the controlled rectifier 105 at a time when this controlled rectifier is forward biased.

Whenever the switch 44 is closed the power switch 60 is enabled to provide power through the transformer 58 to the full-wave rectifier 56. When the trigger 54 of the ignitron tube 46 is excited by a pulse from the pulsing means 16, a higher power electric pulse is coupled through the conductor paths 18 and 19 to the pulse delivery means 9. The pulse itself is coupled through the rectifier circuit 29 and the contacts 26 and 28 to excite the component being tested 23 and cause it to oscillate with the capacitor 36. The fast recovery rectifier 30 isolates the decaying oscillatory voltage wave from the surge generation means 14. Because of the low-impedance interconnecting the component 24 and the capacitor 36, a sharp decaying oscillation occurs, thereby allowing for a more accurate determination of whether a fault exists in a low-impedance component being tested.

FIG. 4 is a partial schematic diagram showing another embodiment of this invention in which the need for the pulse amplification provided by the pulsing means 16 of FIGS. 1 and 3 has been eliminated by substituting a power semiconductor controlled rectifier 204 for the ignitron tube 46 of FIG. 3. Because the power semiconductor controlled rectifier 204 can be fired with a signal of a lower magnitude, the synchronizing pulse developed across the conductors 172 and 174 of FIG. 3 is coupled directly to the power controlled rectifier 204. Thus this controlled rectifier is immediately turned on upon the generation of a synchronizing pulse coincident with the cyclic forward bias on its anode-cathode junction.

This invention is not limited to the particular details of the preferred embodiments illustrated. It is contemplated that many variations, modifications and applications will occur to those skilled in the art, including semiconductor configurations, pulsing means, power sources, and low-impedance couplings. It is intended, therefore, that the appended claims cover those deviations, and applications which do not depart from the true spirit and scope of this invention.

What I claim as new and desire to secure by Letters Patent of the United States is:

1. Equipment for testing the inductive reactance of an electric component by applying a surge of electric energy to the component to shock excite the component and produce an oscillatory voltage wave which is monitored to determine the quality of the component comprising, in combination:
   a. means for generating surges of electric power, each of said surges having a wave front with a rapid rate of change of voltage and current with respect to time, said means for generating surges having the capacity to deliver high-power surges which are capable of burning out contaminants causing short circuits to occur in the electric component;
   b. first and second contacts connectable to the electrical component to which the surges are to be applied, and low-impedance means for connecting said contacts to the output of said means for generating surges;
   c. a capacitor and means for connecting said capacitor across said first and second contacts so that said capacitor oscillates with the electric component being tested when a surge of electric energy is applied to the electric component;
   d. and a fast recovery rectifier circuit connected between the point where said capacitor is connected to one of said contacts and said means for generating surges of electric power, said fast recovery rectifier circuit coupling the surges of electric energy to the electric component being tested and isolating said capacitor and the component from said means for generating surges after a surge has been coupled to the component.

2. Equipment for testing the inductive reactance of an electric component by applying a surge of electric energy to the component to shock excite the component and produce an oscillatory voltage wave which is monitored to determine the quality of the component comprising, in combination:
   a. means for generating surges of electric power, each of the surges having a wave front with a rapid rate of change of voltage and current with respect to time, said means for generating surges of electric power including means for synchronizing the generation of the surges with the AC voltage coupled from an AC source to said equipment;
   b. low-impedance coupling means having a first electric path and a second electric path and means for connecting one end of each of said paths of said low-impedance coupling means to a separate point on said means for generating surges of electric power;
   c. and surge delivery means physically separable from said means for generating surges; said surge delivery means including first and second contacts connectable to the electric component to be tested; a capacitor; means for mounting said capacitor on said surge delivery means and means for connecting said capacitor to said first and second contacts; means for connecting the other end of said first path to said first contact and means for connecting the other end of said second path to said second contact; said equipment further including a fast recovery rectifier circuit connected between said means for generating surges and said contacts for isolating said capacitor and the component to be tested from said means for generating surges after a surge has been coupled to the component.

* * * * *